W. M. CONGER.
Grain-Drill.
No. 42,350.                        Patented Apr. 19, 1864.
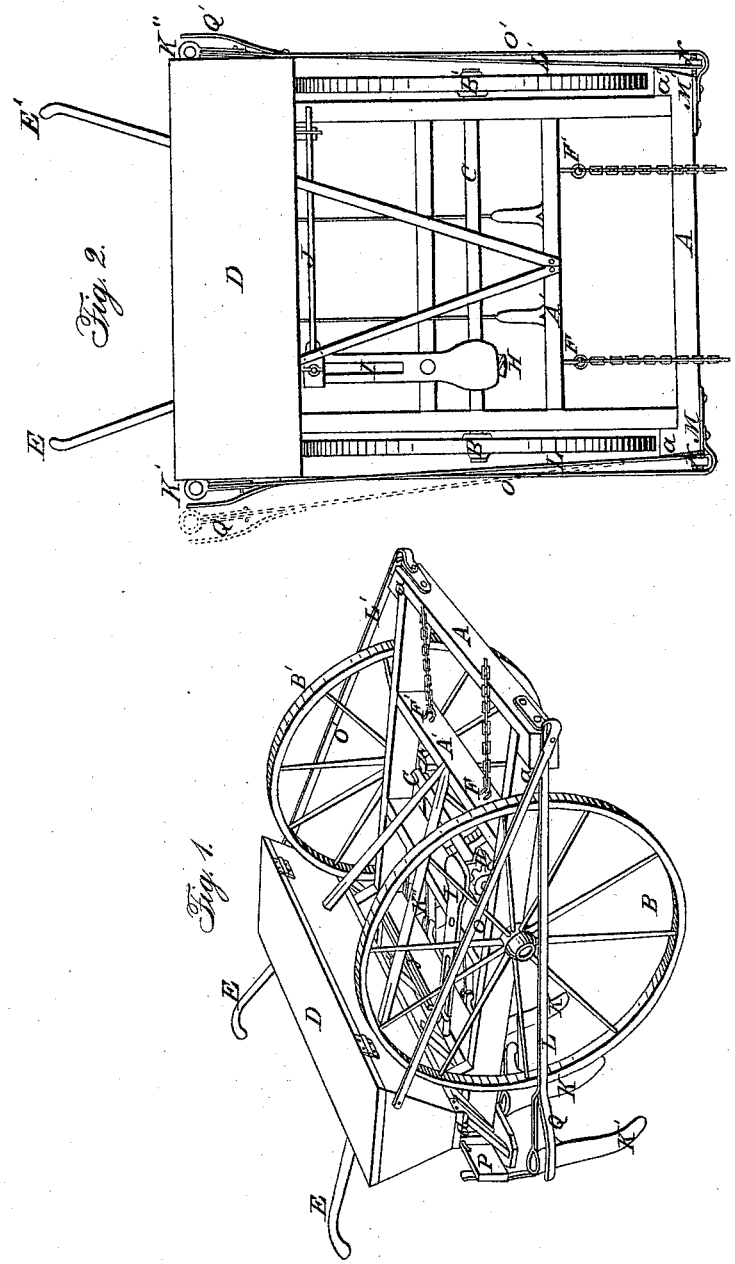
Witnesses:
Charles L. Fisher
Lyman Walker
Inventor:
W. M. Conger
pr Knight Bros
Attys

UNITED STATES PATENT OFFICE.

WHEELER M. CONGER, OF SUGAR VALLEY, OHIO.

IMPROVEMENT IN GRAIN-DRILLS.

Specification forming part of Letters Patent No. 42,350, dated April 19, 1864.

*To all whom it may concern:*

Be it known that I, WHEELER M. CONGER, of Sugar Valley, Preble county, Ohio, have invented a new and useful Improvement in Grain-Drills; and I do hereby declare the following to be a full, clear, and exact description thereof, reference being had to the accompanying drawings, making part of this specification.

This invention relates to an improvement on the common grain-drill, by which it is adapted to act with more efficiency and completeness between rows of corn and other open crops.

Figure 1 is a perspective view of a machine embodying my invention. Fig. 2 is a top view of the same.

The frame A is mounted on a pair of wheels, B B', of which one wheel, B, is fast to the axle C, while the other wheel, B', revolves freely upon said axle. The hopper D rests upon and is attached to the frame immediately in rear of the wheels B B', so as to enable it to be extended on each side far enough for supplying grain to a pair of supplementary or outside drill-teeth, to be presently described.

E E' are handles by which the machine is guided. I use neither pole nor tongue, but attach my team, by trace-chains simply, to a pair of hooks, F F', extending forward from the second cross-rail, A', of the frame, which, by reason of the proximity of the rail A' to the wheels, adapts the implement to be turned much more readily by the handles E E' than would be possible if the chains were attached to the front of the frame. This mode of attaching the draft enables the husbandman to guide the implement close up to the hills of corn, and also to avoid disturbing any hills which happen to be out of line. It also enables the implement to be advanced to the end of the row and then turned sharply around the corner, so as to utilize all the land without injury to the growing crops. The slide G may be operated by a customary zigzag cam, H, attached to the axle, the motion being transmitted through a lever, I, and pitman J, and the latter being adjustable toward or from the center of the lever for a greater or less stroke of the slide.

K are drill-teeth, of customary construction and arrangement—that is to say, having their attachments between the wheels. In line with the customary drill-teeth, I provide two additional or supplemental drill-teeth, K' K'', which meet the ground outside of the track of the wheels, their drag-bars L L' extending forward outside of the wheels, and being secured to the front portions of the frame by means of screw-bolts M M' and nuts N N'. Projections $a$ $a'$ upon the frame, affording fulcrums for the drag-bars L L', enable the supplemental drill-teeth K' K'' to be adjusted for a broader or narrower tilt by the screwing in or out of the nuts N. Braces O O', extending from the bolts M M' to the hopper, serve to stiffen the machine and to prevent the displacement of the nuts N N'. The supplemental drill-teeth K' K'' are suspended at rear from the customary tail-board, P, which is made long enough for that purpose. Guards Q Q', projecting rearward and outward from the supplemental drag-bars L L', prevent entanglement of the machine with the growing crop.

I claim herein as new and of my invention—

1. The provision of nuts N N' and fulcrums $a$ $a'$, for adjusting the supplemental drag-bars L L' and supplemental drill-teeth K' K'' to a greater or less breadth of tillage, in the manner set forth.

2. Applying the draft chains or traces to a second cross-rail, A', near the axle C, substantially as and for the purposes specified.

3. The provision of the guards Q Q' on the supplemental drag-bars L L', for the object stated.

In testimony of which invention I hereunto set my hand.

WHEELER M. CONGER.

Witnesses:
  ROBERT MILLER,
  J. M. BROWN.